United States Patent [19]
Green

[11] 3,790,192
[45] Feb. 5, 1974

[54] TRAILER HITCH SAFETY DEVICE
[76] Inventor: Edgar E. Green, Rt. 2, Box 55A, Shelbyville, Tex. 75973
[22] Filed: July 14, 1972
[21] Appl. No.: 271,890

[52] U.S. Cl. .............................. 280/507, 280/511
[51] Int. Cl. ............................................ B60d 1/06
[58] Field of Search ............ 280/507, 511, 512, 457

[56] References Cited
UNITED STATES PATENTS
3,226,133  12/1965  Geresy ................................ 280/507
3,442,534  5/1969  McCorkle ........................... 280/511
3,046,038  7/1962  Hollis ................................. 280/512

Primary Examiner—Robert R. Song
Attorney, Agent, or Firm—A. Yates Dowell, Jr.

[57] ABSTRACT

Apparatus for locking a trailer hitch socket to a ball carried by a propelling vehicle to prevent separation of the ball and socket in the event that the conventional connecting means should fail or if the ball should fracture.

5 Claims, 5 Drawing Figures

PATENTED FEB 5 1974 3,790,192

TRAILER HITCH SAFETY DEVICE

BACKGROUND OF THE INVENTION

1. Field of the Invention

This invention relates generally to safety devices of various kinds and relates particularly to safety devices for connecting a propelling vehicle to a towed vehicle in a manner to prevent separation of the vehicles.

2. Description of the Prior Art

Heretofore many efforts have been made to connect a self-propelled vehicle to a non-propelled or towed vehicle in a manner which would permit relative swinging motions so that the non-propelled vehicle would track behind the propelled vehicle; however, the vehicles could navigate around corners and other turns. The most successful connection between the propelled and non-propelled vehicles has been a ball and socket type connection with the ball being mounted on a lug carried by the propelled vehicle and the socket being attached to the tongue of the non-propelled vehicle.

Normally some mechanism is adjustably mounted on the socket to rotatably clamp the ball within the socket. Occasionally the clamping mechanism has failed with the result that the towed vehicle became detached from the propelling vehicle. For safety most states prohibit non-propelled vehicles from carrying passengers so that if the non-propelled vehicle becomes separated from the propelling vehicle, the passengers will not be confined within an unguided vehicle and will not be subjected to bodily injury if the non-propelled vehicle should crash. In most areas safety chains are required which connect the non-propelled vehicle to the propelling vehicle in a location other than the ball and socket hitch so that if the hitch becomes separated, the chains are supposed to provide some measure of control for the non-propelled vehicle.

Safety chains have not been entirely satisfactory since they must be provided with sufficient slack to permit the vehicles to swing relative to each other when navigating a corner or the like. When the trailer hitch becomes separated, safety chains are frequently subjected to a sudden jerk which has caused the safety chains to snap.

Some attempts have been made to provide a safety hitch by locking the socket to the ball of the coupling. Some examples of such prior art structures are the patents to Zagelmeyer U.S. Pat. No. 2,125,479; Sprague U.S. Pat. No. 3,048,286; and McCorkle U.S. Pat. No. 3,442,534. Additionally the patent to Geresy U.S. Pat. No. 3,226,133 discloses apparatus for locking an auxiliary ball to a socket to preclude application of the socket to a conventional hitch ball and thereby prevent the non-propelled vehicle from being stolen. The patent to Blasdell U.S. Pat. No. 2,546,520 discloses apparatus for transmitting electrical energy from the propelling vehicle to the non-propelled vehicle.

SUMMARY OF THE INVENTION

The present invention is a safety device for maintaining a ball and socket in assembled relationship with each other even though the conventional clamping mechanism becomes inoperative or if the ball structure should fracture. The apparatus includes a rod which extends downwardly through the assembled ball and socket and such rod has a curved upper portion adapted to overlie a portion of the socket. The opposite end of the rod is provided with an opening for receiving a locking pin or the bolt of a lock which prevents unauthorized detachment of the non-propelled vehicle from the propelling vehicle.

It is an object of the invention to provide a trailer hitch safety device of relatively simple construction but which will maintain the hitch in assembled relationship at all times.

DESCRIPTION OF THE PREFERRED EMBODIMENTS

Figure 1:
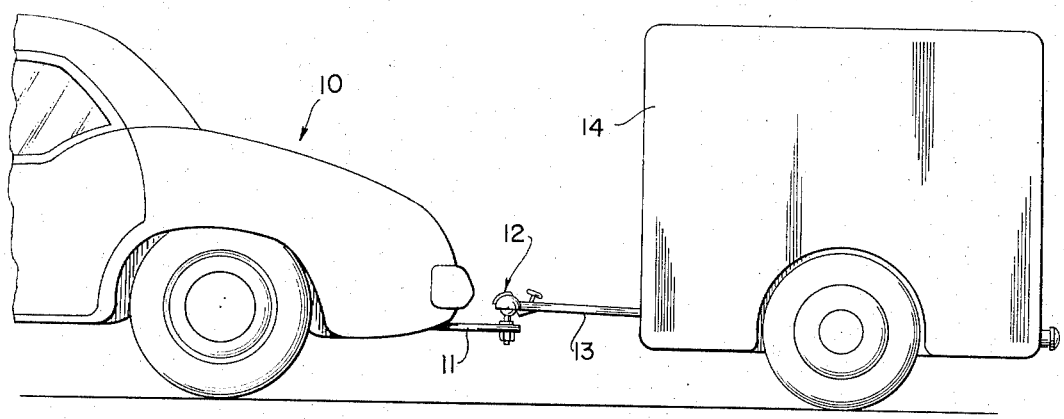
FIG. 1 is a side elevation illustrating one application of the invention.

With continued reference to the drawing, a propelled vehicle 10, such as an automobile, truck, tractor, or the like, is provided with a rearwardly extending lug 11 which normally is connected to the frame of the vehicle. The lug 11 is adapted to be connected by a hitch or coupling 12 to the tongue 13 of a trailer or non-propelled towed vehicle 14. The hitch 12 includes a ball member 15 having a spherical portion 16 integrally connected to a neck 17 having a threaded extremity 18 of reduced diameter. The extremity 18 extends through an opening 19 in the lug 11 and is fixed thereto by a nut 20.

The spherical portion 16 of the ball member slidably engages the cup 21 of a socket member 22. Such socket member is bolted, riveted, welded or otherwise fixed to one end of the tongue 13 of the trailer 14. The socket member 22 includes a clamp 23 and an operating member 24 of conventional construction to retain the spherical portion 16 of the ball member within the cup 21 of the socket member. The structure thus far described is conventional in the prior art and forms no part of the present invention.

In order to lock the socket member 22 onto the ball member 15, the ball member is provided with an axial bore or opening 27 extending entirely through the spherical portion 16, neck 17 and threaded extremity 18. A rod or connecting pin 28 is provided having a straight lower portion 29 and a curved upper portion 30. The rod 28 is of a diameter such that the lower portion 29 is snugly received within the bore 27 of the ball member and the curved upper portion 30 is of a configuration substantially complementary to the curved exterior surface of the socket member 22. In order for the rod 28 to extend through the socket member, an opening 31 of a diameter substantially larger than the diameter of the rod is provided in the upper portion of the cup 21. The opening 31 permits the ball member 15 and the socket member 22 to move relative to each other in both vertical and horizontal planes.

Figure 3:
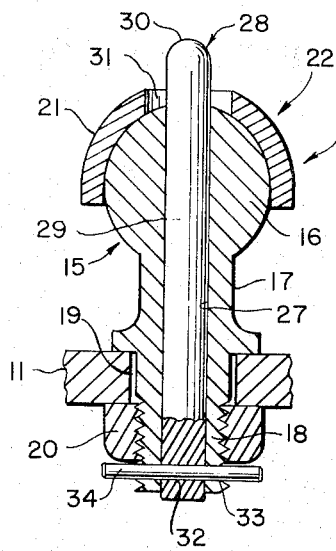
FIG. 3 is a section on the line 3—3 of FIG. 2.
Figure 2:
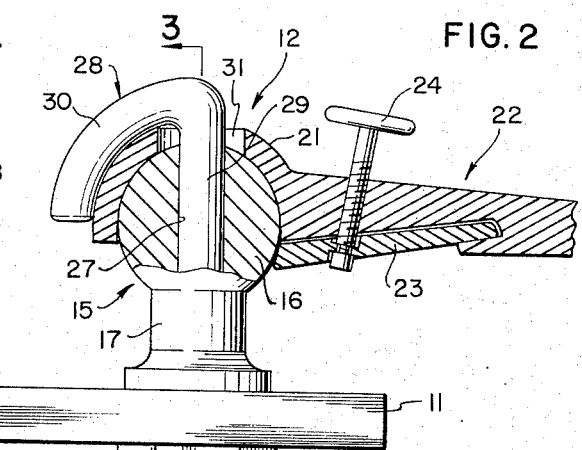
FIG. 2 is an enlarged side elevation with portions broken away for clarity of a hitch coupling with the device of the present invention applied thereto.

In order to lock the rod 28 within the ball member 15, a transverse opening 32 is provided through such rod adjacent to the lower extremity of the lower portion 29 and a corresponding opening 33 is provided in the threaded extremity 18. With particular reference to FIG. 3, when the openings 32 and 33 are in registration, a roll pin 34 or other locking pin is inserted through the aligned openings and projects outwardly from each side of the threaded extremity 18. As illustrated, the roll pin 34 is disposed below the nut 20 and prevents such nut from becoming accidentally detached. It is contemplated that the nut 20 could be replaced by a conventional castle nut in which case the roll pin is disposed within the slots thereof.

Figure 4:
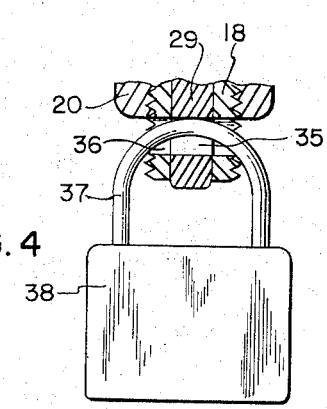
FIG. 4 is a fragmentary section of a modified form including a lock mechanism.

With particular reference to FIG. 4, a modified form of the invention is disclosed in which the lower extremity of the lower portion 29 is provided with an elongated vertically disposed slot 35 and the threaded extremity 18 of the ball member is provided with a corresponding slot 36. When the slots 35 and 36 are in registration, the arcuate bolt 37 of a lock 38 is inserted through the slots and the lock is locked. When the lock is applied, the socket member 22 cannot be separated from the ball member 15 until the lock is removed.

Figure 5:
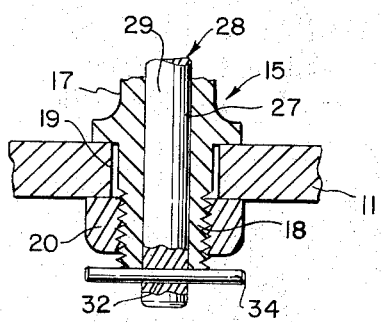
FIG. 5 is a fragmentary section of a further modified form of the invention.

With reference to FIG. 5, a further modified form of the invention is provided in which the opening 33 in the threaded extension 18 is eliminated and the opening 32 through the rod 28 is located below such threaded extension. This may permit partial rotational movement of the rod; however, the ball member 15 can be mounted indiscriminately and it is not necessary to align the opening 32 of the rod with any other opening.

In the operation of the device, the socket member 22 is placed on the ball member 15 and the operating mechanism 24 is adjusted to clamp the ball member and socket member in assembled relationship. Thereafter the rod 28 is inserted through the opening 31 of the socket member and through the bore 27 of the ball member until the opening 32 of the rod is in registration with the opening 33 of the threaded extension 18, or the slot 35 is in registration with the slot 36, or the opening 32 is disposed below the threaded extension 18. The locking pin 34 or the lock 38 then is inserted through the opening 32 to prevent the rod 28 from being withdrawn. In this position, the upper portion of the rod 30 overlies a portion of the cup 21 of the socket member to prevent accidental separation thereof. If the operating member 24 of the clamp should fail, the rod 28 maintains the socket member and the ball member in assembled relationship while permitting swivel action between the propelling vehicle 10 and the trailer 14.

If the spherical portion 16, neck 17, or threaded extremity 18 of the ball member should fracture through use or as the result of an accident, the rod 28 maintains the socket member 22 connected to the lug 11 of the propelling vehicle.

When the lock 28 is applied, the socket member 22 cannot be removed from the ball member 15 without authorization of the operator of the propelling vehicle.

I claim:

1. In a hitch for connecting a trailer to a propelling vehicle, said hitch including a ball member having a portion extending through an opening in an attaching member carried by said propelling vehicle, means for connecting the ball member to the attaching member, and a socket member fixed to the trailer and having a recess engageable with said ball member; the improvement comprising said ball member having a bore extending entirely through the same along a vertical axis and said socket member having an opening extending entirely through the same along the vertical axis of said recess, rod means having a first portion extending through the bore of the ball member and the opening of said socket member and a second portion overlying said socket member, the end of said first portion remote from said second portion having a transverse opening, and pin means mounted in said transverse opening, said pin means extending outwardly of said rod means a distance greater than the size of the opening in the attaching member of said propelling vehicle, whereby said rod means and said pin means provide a safety connection between said propelling vehicle and said trailer.

2. The structure of claim 1 in which the opening in said socket member is larger in diameter than the bore of said ball member.

3. The structure of claim 1 in which said pin means includes an elongated pin.

4. The structure of claim 1 in which said pin means includes a lock member.

5. A safety hitch for selectively connecting a trailing vehicle having a tongue to a propelling vehicle having an attaching member with an opening therethrough, comprising a ball member carried by said propelling vehicle, said ball member including a body having an enlarged substantially spherical portion at one end, mounting means at the other end of said body extending through the opening in the attaching member, means for connecting said mounting means to said attaching member along a generally vertical axis, said body having an axial bore extending entirely through the same, a socket member fixed to the tongue of the trailing vehicle, said socket member having a partly spherical recess for receiving the enlarged spherical portion of said body, said socket member having an opening extending entirely through the same along the vertical axis of said recess, the opening of said socket member being substantially larger than the bore of said ball member, substantially rigid rod means having an elongated substantially straight lower portion extending through the opening of said socket member and extending through the bore of said ball member, said rod means having an upper portion disposed at an angle to said lower portion and extending outwardly to a position overlying said socket member, said rod means having a transverse opening extending entirely through the same adjacent to the lower end of said lower portion, pin means receivable within said transverse opening of said rod means and extending outwardly of said rod means a distance greater than the size of the opening of the attaching member, whereby said rod means provides a safety connection between said propelling vehicle and said trailing vehicle.

* * * * *